United States Patent [19]
Fortman et al.

[11] Patent Number: 5,987,100
[45] Date of Patent: Nov. 16, 1999

[54] UNIVERSAL MAILBOX

[75] Inventors: Peter A. Fortman; Lester L. White, both of Raleigh, N.C.; Thomas Kredo, Rochester, N.Y.

[73] Assignee: Northern Telecom Limited, Canada

[21] Appl. No.: 08/841,516

[22] Filed: Apr. 23, 1997

[51] Int. Cl.⁶ .................................................. H04M 1/64
[52] U.S. Cl. ..................... 379/88.14; 379/88.26
[58] Field of Search ............................. 379/88.13, 88.14, 379/88.25, 88.26

[56] References Cited

U.S. PATENT DOCUMENTS

| | | | |
|---|---|---|---|
| 4,902,881 | 2/1990 | Janku | 235/381 |
| 5,138,653 | 8/1992 | Le Clercq | 379/96 |
| 5,339,156 | 8/1994 | Ishii | 358/402 |
| 5,351,276 | 9/1994 | Doll, Jr. et al. | 379/67 |
| 5,416,831 | 5/1995 | Chewning, III et al. | 379/96 |
| 5,479,408 | 12/1995 | Will | 370/94.1 |
| 5,479,411 | 12/1995 | Klein | 370/110.1 |
| 5,483,352 | 1/1996 | Fukuyama et al. | 358/402 |
| 5,497,373 | 3/1996 | Hulen et al. | 370/79 |
| 5,500,893 | 3/1996 | Onosaka | 379/396 |
| 5,524,137 | 6/1996 | Rhee | 379/93 |
| 5,630,060 | 5/1997 | Tang et al. | 379/88.13 |
| 5,675,507 | 10/1997 | Bobo, II | 364/514 |
| 5,740,230 | 4/1998 | Vaudreuil | 379/93.14 |

FOREIGN PATENT DOCUMENTS

WO 87/07801 12/1987 WIPO.

*Primary Examiner*—Fan S. Tsang
*Attorney, Agent, or Firm*—Finnegan, Henderson, Farabow, Garrett & Dunner, L.L.P.

[57] ABSTRACT

A messaging center, connected to a communications network, processes messages intended for a subscriber. A caller sends a message to the message center in a first caller format. The message center stores the message in the first caller format, notifies the subscriber, and awaits a request for the stored message from the subscriber. In response to the message request, the message center sends the stored message to the subscriber in a first subscriber format independent of the first caller format. If the subscriber desires, the subscriber constructs a response to the message and sends it to the message center in a second subscriber format independent of the first caller format and the first subscriber format. The message center stores the response in the second subscriber format and sends the stored response to the caller in a second caller format independent of the first caller format and the first and second subscriber formats.

40 Claims, 9 Drawing Sheets

UNIVERSAL MAILBOX

BACKGROUND OF THE INVENTION

The present invention relates generally to messaging and more particularly to a universal messaging center or mailbox that notifies subscribers of any type of message that is waiting for them, for example, voice mail, fax mail, e-mail, etc., and allows subscribers to retrieve and respond to the messages in formats independent not only of each other but also of the format in which the message was originally transmitted.

The trend in the telecommunications industry is toward providing a wide variety of information and communication services, or messaging services, over various communications networks to remote subscribers having diverse analog and digital communications equipment. These messaging services might include voice messaging, facsimile messaging, electronic mail, electronic document interchange, interactive voice response, audio text, speech synthesis, speech recognition, video messaging, video mail, etc.

To provide these messaging services, different types of communications equipment and processing protocols connect to a single host system or messaging center that provides the messaging services. The messaging center performs protocol conversions between the format employed by the messaging center and the various telecommunications formats employed by the diverse subscriber equipment.

Companies that provide messaging services over the public telephone network traditionally use hardwired transceiving and protocol conversion equipment dedicated to a particular type of equipment and communications format and protocol. Unfortunately, this approach suffers from high costs and lack of flexibility and adaptability. The disadvantages arise because dedicated hardware cannot be readily modified to increase data throughput, or handle communication protocols from new telecommunications equipment or services. Supporting multiple types of messaging services for diverse communications equipment thus requires costly module replacements and new designs for dedicated hardware.

Recently, some developers have proposed digital signal processing and multimedia interfaces to process the communication trunk lines. For example, U.S. Pat. No. 5,497,373 to Hulen et al. describes a system with a host messaging center that supports numerous types of messaging applications and makes the necessary protocol conversions for different telecommunications protocols corresponding to various types of telecommunications media. The system uses multiple digital signal processors to perform real time protocol conversions between the different telecommunication protocols and the protocol of the host messaging center.

FIG. 1 is a block diagram showing how Hulen et al.'s messaging system might connect to multimedia subscribers through various public and private communications networks 1100, including, for example, a public switched telephone network (PSTN), a public cellular or mobile telephone network (PLMN), and a packet switched public data network (PSPDN). The messaging system includes telephony front end equipment 1200, multimedia interface 1300, and host messaging center 1400.

Telephony front end 1200 interfaces to communications networks 1100 and provides the necessary interface between a subscriber's voice or data channel from communications network 1100 and the messaging system. Multimedia interface 1300 performs protocol conversions of the information received in various telecommunications formats so host messaging center 1400 can process and store the information in the host's data processing and storage format, typically a compressed data format.

Once converted, host messaging center 1400 processes the relevant messaging information extracted from the communications channel to deliver the particular messaging or telephony service requested by the subscriber. Multimedia interface 1300 then converts the information for responding to the subscriber's service request back into the communications protocol format used by the subscriber, and transmits the converted information to the subscriber via telephony front end 1200 and communications network 1100.

Multimedia interface 1300 includes several parallel digital signal processors dynamically allocated to handle different types of protocol conversion for multiple communications channels. Host messaging center 1400 downloads appropriate protocol conversion algorithms to selected digital signal processors depending upon the type of services required by a particular subscriber. The selected digital signal processors convert and store the information in the format of host messaging center 1400 so host messaging center 1400 can process the information according to the particular messaging service requested by the subscriber. The subscriber retrieves the information in the communications protocol format used by the subscriber.

With this system, a subscriber's responses to the retrieved information were limited to only the precise formats that the information was stored and retrieved. This limited the subscriber's options to retrieve and respond to messages by not allowing use of other telecommunications equipment having different or multiple formats.

Therefore, a need exists to take advantage of the capabilities of current telecommunications equipment to provide subscribers with greater flexibility in the formats of retrieval and responses to messages.

SUMMARY OF THE INVENTION

The present invention addresses this need by providing a universal mailbox by which a subscriber can retrieve a pending message in a format independent of the format used to store the message, and respond to the message in a format independent of the format used to store or retrieve the message.

In accordance with the purpose of the invention as embodied and broadly described herein, the universal mailbox according to the principles of the present invention processes messages intended for a subscriber. A caller sends a message to the message center in a first caller format. The message center stores the message in the first caller format, notifies the subscriber, and awaits a request for the stored message from the subscriber. In response to the message request, the message center sends the stored message to the subscriber in a first subscriber format independent of the first caller format.

If the subscriber desires, the subscriber constructs a response to the message and sends it to the message center in a second subscriber format independent of the first caller format and the first subscriber format. The message center stores the response in the second subscriber format and sends the stored response to the caller in a second caller format independent of the first caller format and the first and second subscriber formats.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings that illustrate preferred embodiments consistent with this invention. Other embodiments are possible and changes may be made to the embodiments without departing from the spirit and scope of the invention. The following detailed description does not limit the invention. Instead, the scope of the invention is defined only by the appended claims.

In the detailed description that follows, "subscriber" refers to a person that subscribes to the services provided by the universal mailbox. The subscriber can store messages for other subscribers in the universal mailbox or retrieve messages that have been stored therein. A "caller," on the other hand, refers to a person who does not subscribe to the universal mailbox services. The caller's actions are limited to leaving messages for subscribers. The universal mailbox consistent with the principles of the present invention permits subscribers to retrieve and respond to any type of stored message in whatever format the subscribers desire.

I. System Elements

Figure 1:
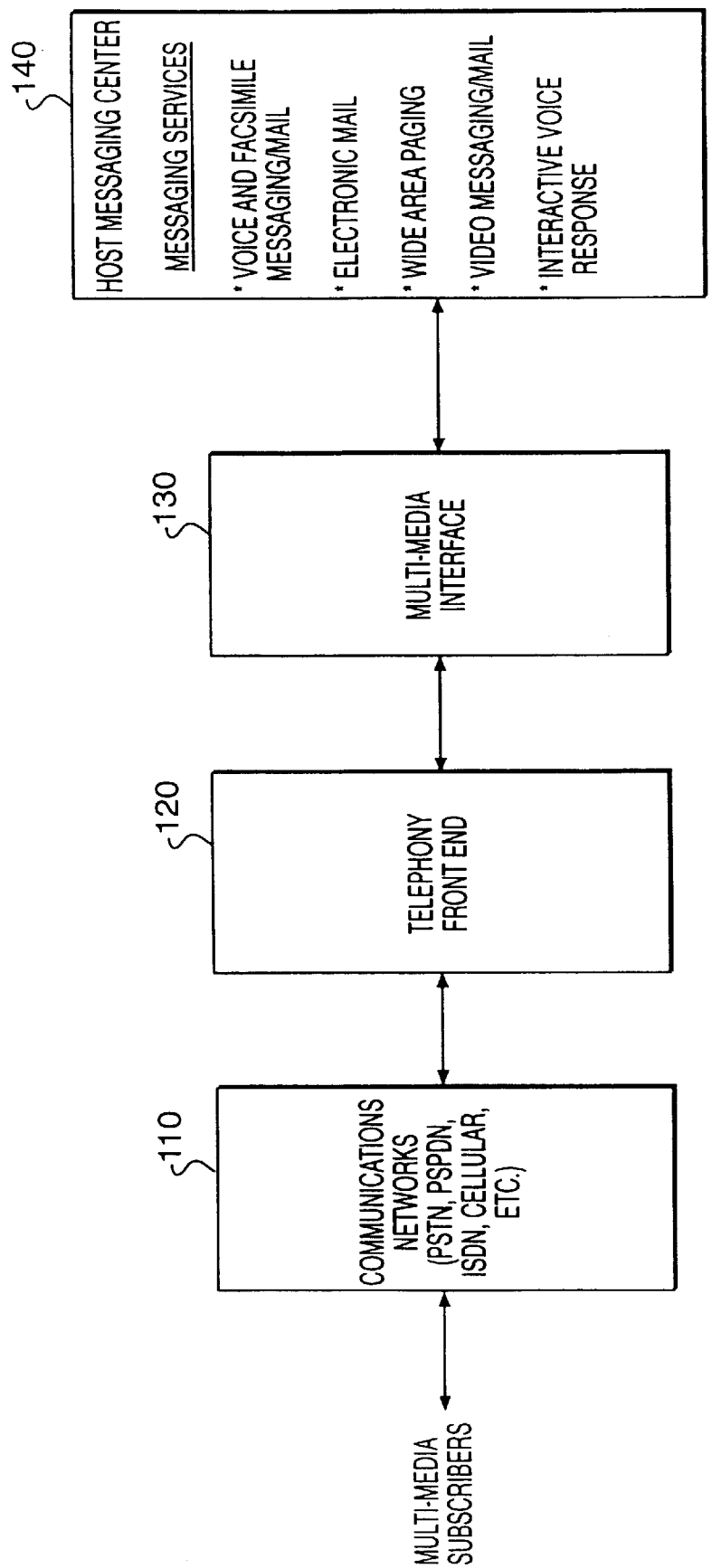
FIG. 1 is a block diagram of a conventional messaging system.
Figure 2:
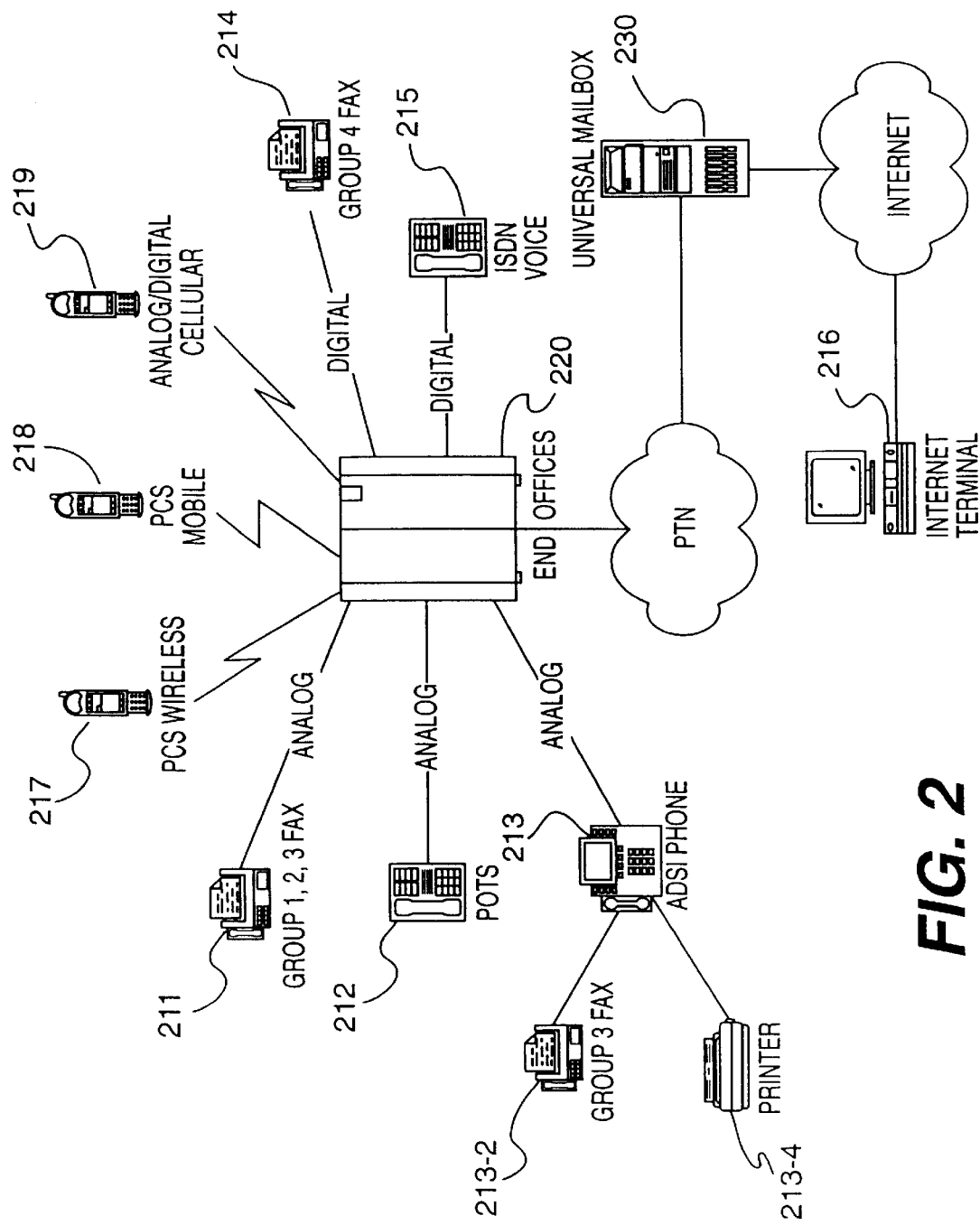
FIG. 2 is a block diagram of a communications network having the universal mailbox of the present invention.

FIG. 2 is a block diagram of a communications network containing the universal mailbox of the present invention. Subscribers of the universal mailbox service connect to the network via a variety of telecommunications equipment through analog, digital, and Internet lines, and wireless connections. The subscriber equipment includes, but is not limited to, group 1, 2, 3 facsimile machine 2110, Plain Old Telephone System (POTS) telephone 2120, Analog Display Services Interface (ADSI) telephone 2130, group 4 facsimile machine 2140, ISDN telephone 2150, computer terminal 2160, Personal Communications Services (PCS) wireless telephone 2170, PCS mobile telephone 2180, and analog/digital cellular telephone 2190. ADSI telephone 2130 might include group 3 facsimile machine 2132 and printer 2134 connected thereto.

End offices 2200 connect the subscriber equipment, except for Internet terminal 2160, to the network. Group 1, 2, 3 facsimile machine 2110, POTS telephone 2120, and ADSI telephone 2130 connect to end offices 2200 over conventional analog lines. Group 4 facsimile machine 2140 and ISDN telephone 2150 connect over conventional digital lines. PCS wireless telephone 2170, PCS mobile telephone 2180, and analog/digital cellular telephone 2190 connect to end offices 2200 via conventional wireless connections.

End office 2200 connects to universal mailbox 2300 by conventional mechanisms over a Public Telecommunications Network (PTN), such as a Public Switched Telephone Network (PSTN). Internet terminal 2160, on the other hand, connects to universal mailbox 2300 by conventional mechanisms over the Internet. Universal mailbox 2300 includes a computer with conventional connections to the PTN and the Internet, and might include a UNIX-capable computer, such as an HP model or the IBM Risc 6000.

Figure 3:
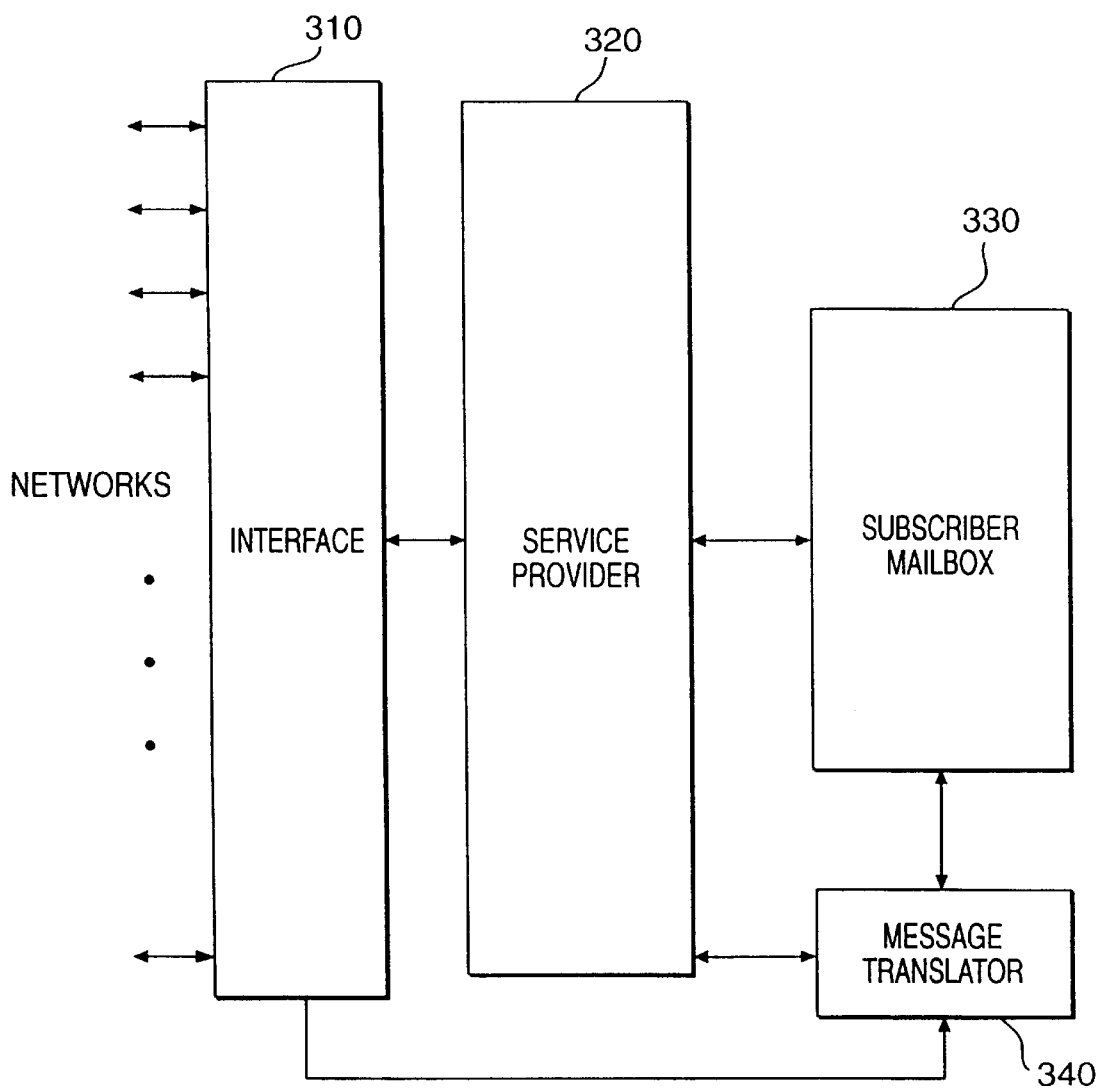
FIG. 3 is a block diagram of the elements of the universal mailbox shown in FIG. 2.

FIG. 3 is a block diagram of the elements of universal mailbox 2300. Universal mailbox 2300 preferably includes interface 3100, service provider 3200, subscriber mailbox 3300, and message translator 3400. Interface 3100 connects universal mailbox 2300 to various telecommunications networks, including the PTN and the Internet.

Figure 4:
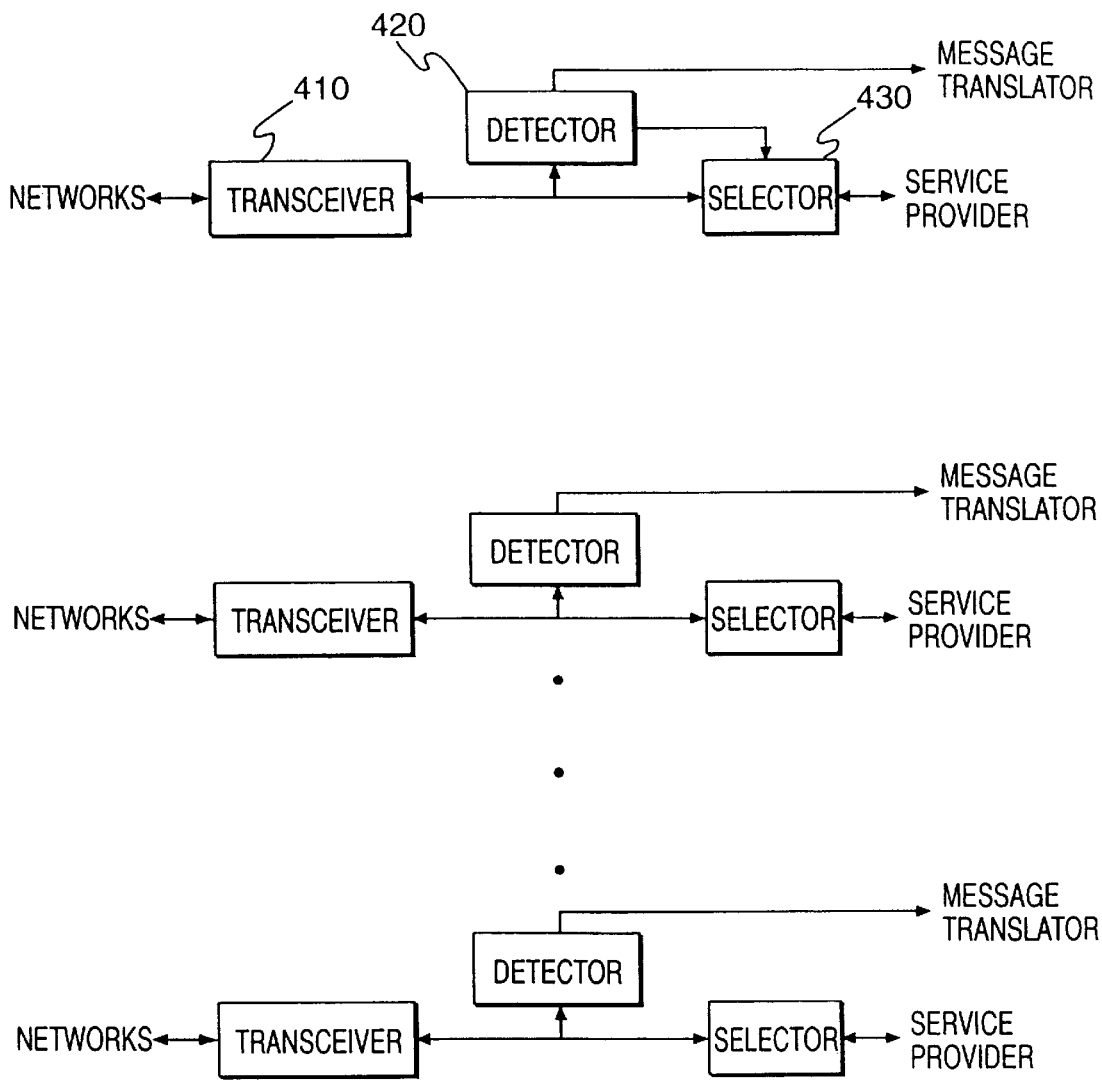
FIG. 4 is a block diagram of the elements of the interface shown in FIG. 3.

FIG. 4 is a block diagram of the elements of interface 3100, including transceivers 4100, detectors 4200, and selectors 4300. Transceivers 4100 interface with the various networks, including the PTN and the Internet, and exchange signals with the subscriber equipment to permit subscribers to store, retrieve, and respond to messages in universal mailbox 2300, and to permit universal mailbox 2300 to notify the subscribers of pending messages awaiting retrieval.

Detectors 4200, which preferably include conventional signal line detectors, detect the type of telecommunications equipment a subscriber is using based upon the types of signals received by transceivers 4100. Detectors 4200 send information indicating the equipment type to message translator 3400 and a selection signal to selectors 4300.

Selectors 4300, which include conventional selectors, such as multiplexers/demultiplexers, route the subscriber signals received by transceivers 4100 to service provider 3200 using the selection signal from detectors 4200, and also route notification signals to the subscribers via transceivers 4100.

Figure 5:
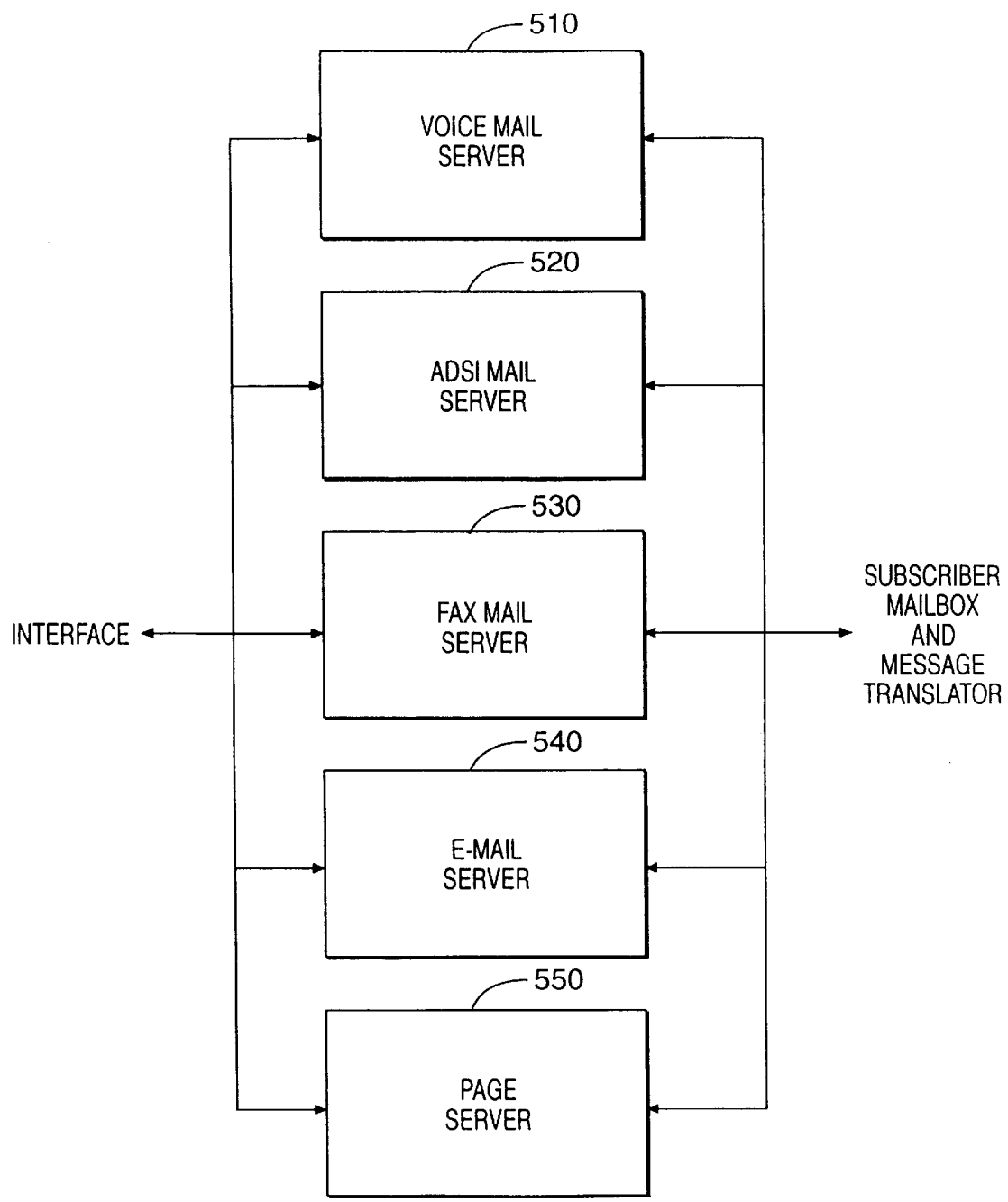
FIG. 5 is a block diagram of the elements of the service provider shown in FIG.3.

Returning to FIG. 3, service provider 3200 connects to interface 3100, subscriber mailbox 3300, and message translator 3400, and provides subscriber services in the various forms as the subscribers require. FIG. 5 is a block diagram of possible elements of service provider 3200, including voice mail server 5100, ADSI mail server 5200, fax mail server 5300, e-mail server 5400, and page server 5500.

Voice mail server 5100 provides voice mail services for a subscriber, including the storage and retrieval of voice messages in subscriber mailbox 3300. Upon receipt of a voice call, voice mail server 5100 detects information regarding the caller, such as calling line identification (CLID) data, from the voice call signal by conventional mechanisms, and stores the caller information along with the voice message in subscriber mailbox 3300.

ADSI mail server 5200 provides ADSI mail services for the subscriber, including the storage and retrieval of voice, ADSI text, and mixed voice and ADSI text messages in subscriber mailbox 3300. Upon receipt of ADSI mail, ADSI mail server 5200 detects the caller information from the ADSI mail signal, as above, and stores the caller information along with the ADSI mail in subscriber 3300. Fax mail server 5300, e-mail server 5400, and page server 5500 store and retrieve fax, e-mail, and page messages, respectively, for the subscriber in the same manner set forth above.

In addition to storing and retrieving the various forms of subscriber messages, servers 5100 through 5500 also notify the subscribers of pending messages in subscriber mailbox 3300 that await retrieval. Table 1 shows examples of various forms of subscriber notification based upon the type of telecommunications equipment the subscriber uses to retrieve the pending messages.

TABLE 1

| RETRIEVAL DEVICE | POTS Phone | ADSI Phone | Pager | Fax | Computer |
|---|---|---|---|---|---|
| NOTIFICATION TYPES | >Phone call >Message waiting light >Message waiting tone. | >Phone call >Message waiting light >Message waiting tone >Display message information on screen >Download message to phone (for non-voice messages). | >Deliver the message. | >Deliver the message. | >Audible or visual alert on screen >Deliver the message. |

Returning to FIG. 3, subscriber mailbox 3300 preferably includes a large-capacity memory device, such as a disk array, with connections to service provider 3200 and message translator 3400. Subscriber mailbox 3300 stores subscriber messages in the different subscriber formats. The particular formats of a pending stored message might include the format used by the caller or subscriber leaving the message and the format typically requested by the subscriber, as described below. Subscriber mailbox 3300 preferably stores the pending messages in both of these formats.

Subscriber mailbox 3300 preferably also stores a database of subscriber profile data. The subscriber profile data includes subscriber-defined information regarding the subscriber's notification preferences. The subscriber profile data might include any of the notification types shown in Table 1, including notifying the subscriber using a message waiting light or tone, or by sending part or all of the message to the subscriber as the notification.

The subscriber profile data could be more specific. The subscriber might associate a notification type with a specific type of telecommunications equipment. For example, the subscriber could designate notification by an ADSI text message when retrieving messages using ADSI phone 2130.

Figure 6:
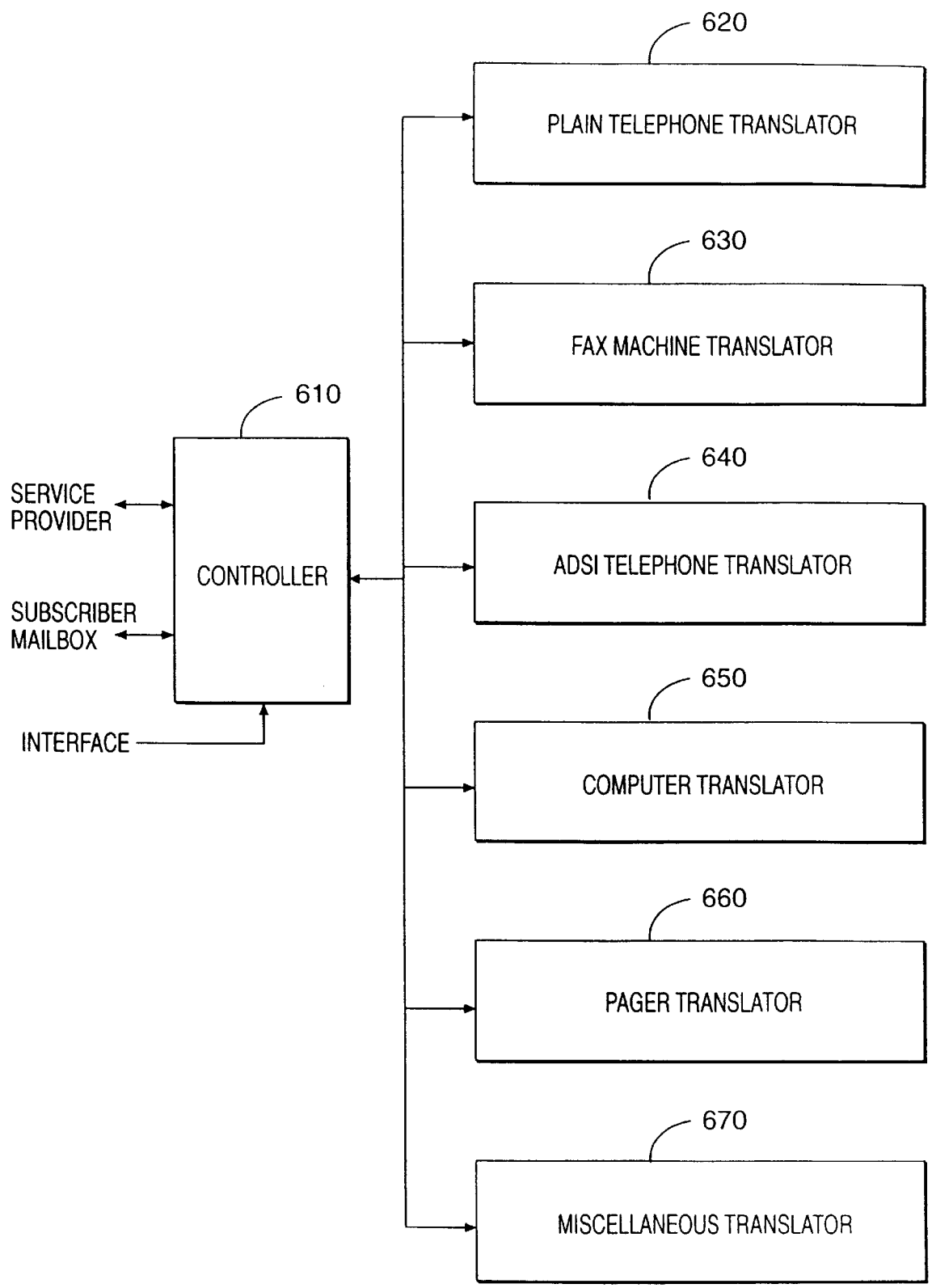
FIG. 6 is a block diagram of the elements of the message translator shown in FIG.3.

Message translator 3400 connects to subscriber mailbox 3300, interface 3100, and service provider 3200, and performs translations between the various subscriber message formats. FIG. 6 is a block diagram of the elements of message translator 3400, including controller 6100, plain telephone translator 6200, fax machine translator 6300, ADSI telephone translator 6400, computer translator 6500, pager translator 6600, and miscellaneous translator 6700.

Controller 6100 preferably includes a standard processor that controls the operation of translators 6200 through 6700. For each message retrieval, controller 6100 records the type of telecommunications equipment the subscriber uses based on the subscriber equipment detected by detectors 4200 of interface 3100. From the recorded equipment type, controller 6100 determines a normal retrieval format for each subscriber. If a subscriber typically retrieves pending messages using POTS telephone 2120, for example, controller 6100 records the subscriber's normal retrieval format as a voice format. Controller 6100 stores the subscriber's normal retrieval format in subscriber mailbox 3300.

During idle periods, as the pending messages reside in subscriber mailbox 3300, controller 6100 retrieves the pending messages from subscriber mailbox 3300, translates them from the stored format to the normal retrieval format using one of the translators 6200 through 6700, and returns the translated messages to subscriber mailbox 3300. Translators 6200 through 6700 execute conventional translation techniques, such as described in U.S. Pat. No. 5,497,373 to Hulen et al., to perform translations from the stored format to the subscriber's normal retrieval format. Table 2 shows examples of various translations performed by translators 6200 through 6700.

TABLE 2

| RETRIEVAL DEVICE TRANSLATOR | POTS Phone | ADSI Phone | Fax | Computer | Pager |
|---|---|---|---|---|---|
| Plain telephone | None. | Message information can be provided in ADSI text format. Voice to ADSI text used for hearing impaired service. | Voice to text to Fax graphics, and Message information. | Voice to sound file (and to text for hearing impaired), and message information. | Message information only. |
| Fax machine | Fax graphics to text to voice. | Fax graphics to ADSI text. | None. | Fax graphics to computer graphics, and message information. | Message information only. |
| ADSI telephone | None for voice. ADSI text to voice. | None. | ADSI text to Fax graphics. | ADSI text to text. | Message information only. |
| Computer | Text to voice. | Text to ADSI text. | Text to Fax graphics. | None. | Message information only. |
| Pager | Text to voice. | Text to ADSI text. | Text to Fax graphics. | None. | None. |

II. Processing

Figure 7:
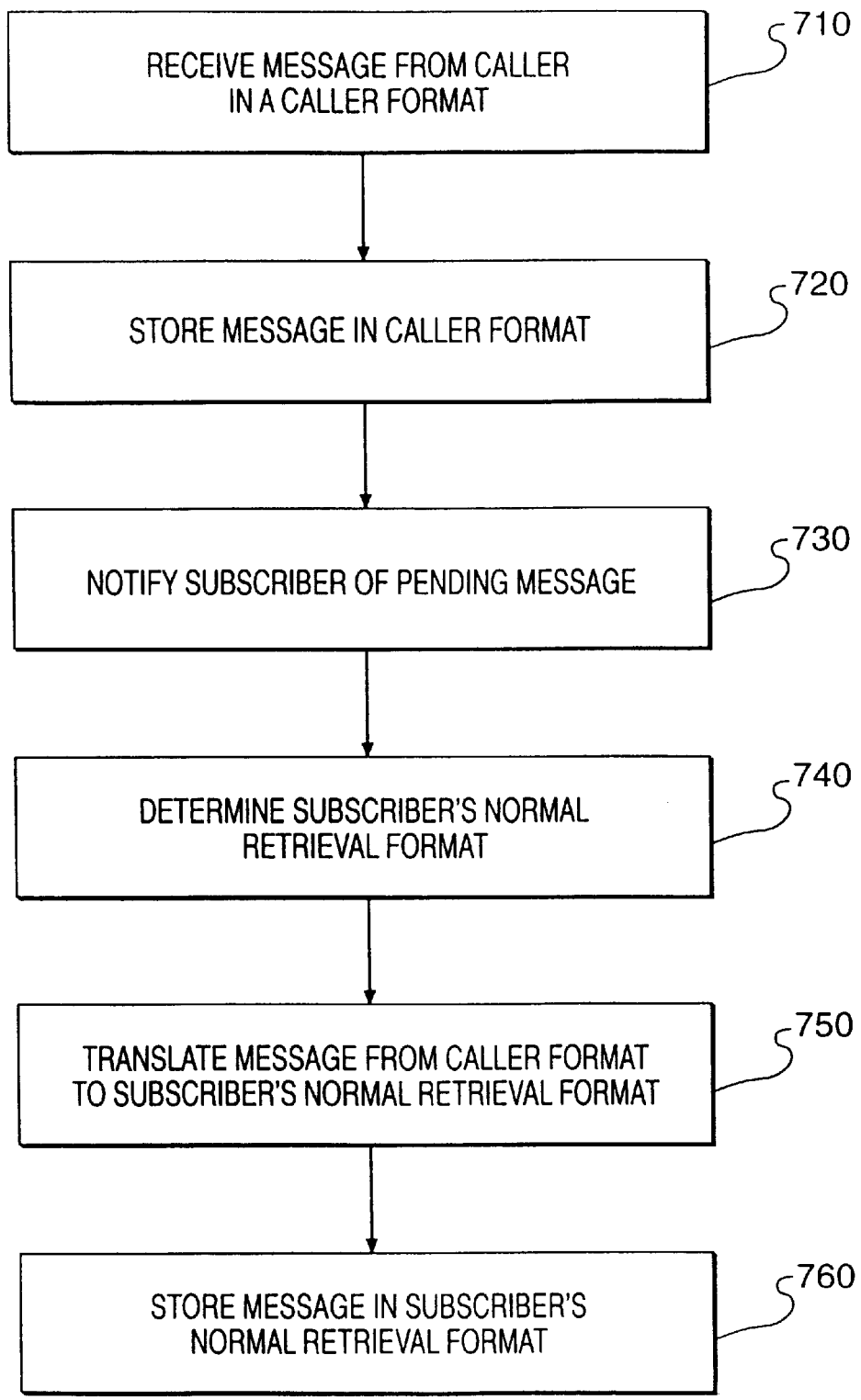
FIG. 7 is a flow chart of a process for storing a message in the universal mailbox consistent with the principles of the present invention.
Figure 8:
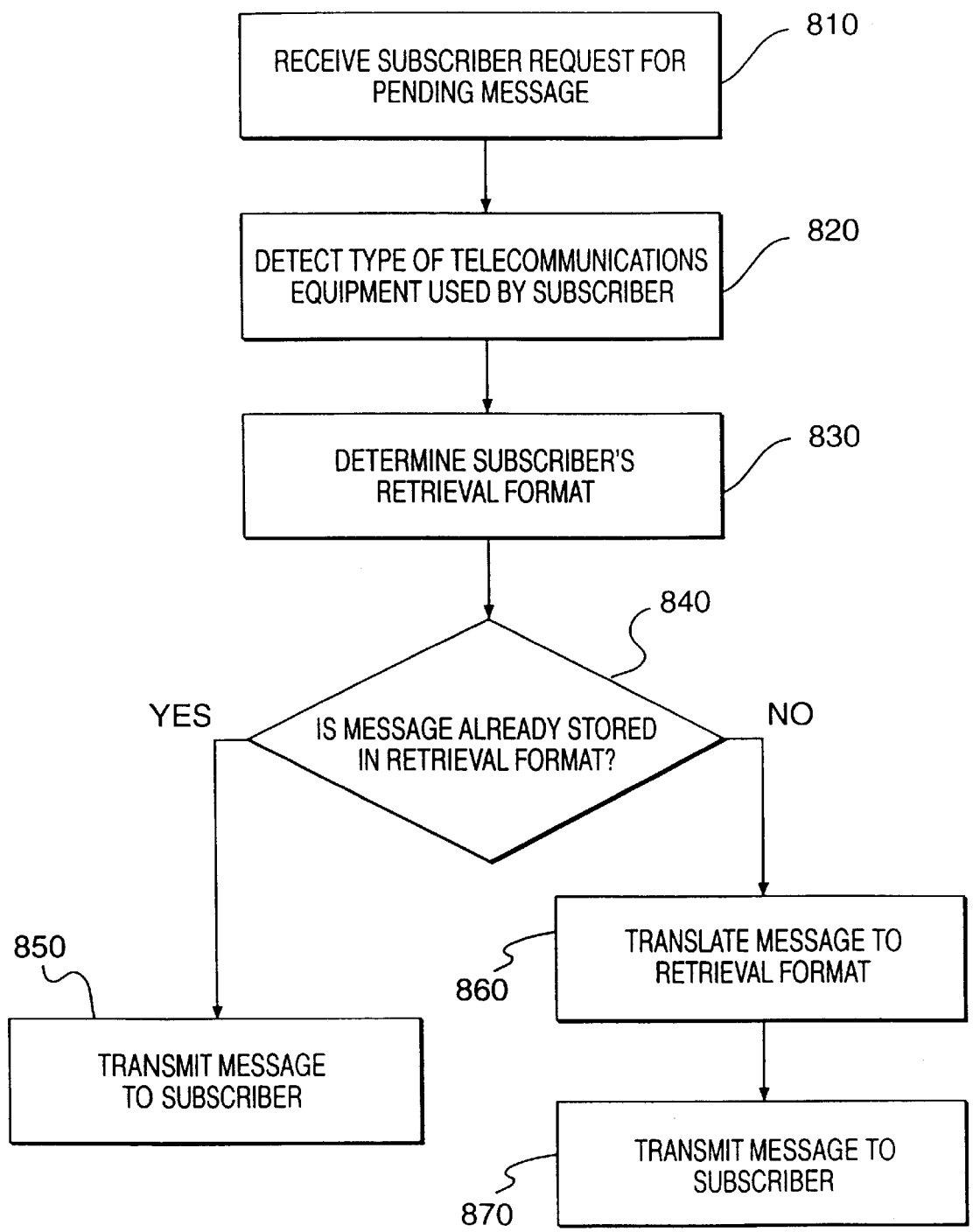
FIG. 8 is a flow chart of a process for retrieving a message from the universal mailbox consistent with the principles of the present invention.
Figure 9:
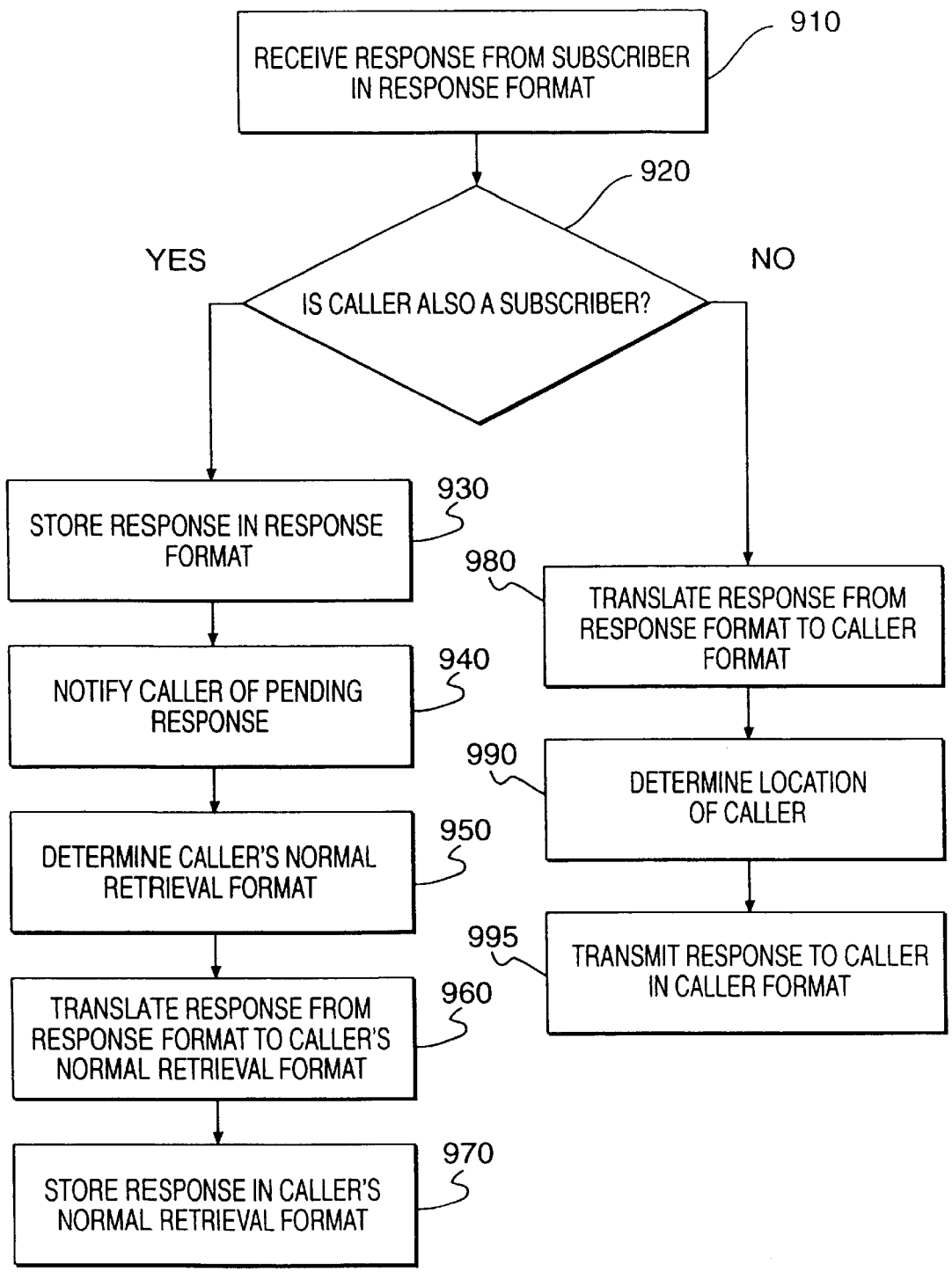
FIG. 9 is a flow chart of a process for responding to a retrieved message consistent with the principles of the present invention.

FIGS. 7–9 are flow charts illustrating the operation of the universal mailbox consistent with the principles of the present invention. FIG. 7 is a flow chart of a process for storing a message in universal mailbox 2300. The process begins when a caller sends a message to a subscriber in a caller format. The caller format depends upon the type of telecommunications equipment the caller utilizes to send the message.

The caller may send the message to universal mailbox 2300 or to the subscriber's telecommunications equipment.

The subscriber's telecommunications equipment would then relay the message to universal mailbox 2300 by conventional mechanisms, when the subscriber is unavailable to receive the message.

In any event, interface 3100 in universal mailbox 2300 receives the message from the caller in the caller format [step 7100], and forwards it to service provider 3200. Service provider 3200 analyzes the message to detect information regarding the caller from the message signal, as described above. Service provider 3200 then stores the message in subscriber mailbox 3300 in the caller format along with the detected caller information [step 7200], and notifies the subscriber of the pending message [step 7300]. Service provider 3200 notifies the subscriber according to the subscriber profile data stored in subscriber mailbox 3300. The subscriber notification may include a message waiting light or tone on the subscriber's telephone, or the message itself delivered to the subscriber's ADSI telephone, pager, fax, or computer (Table 1).

Off-line, during idle periods, message translator 3400 determines the subscriber's normal retrieval format from the information stored in subscriber mailbox 3300 [step 7400]. When the caller format differs from the subscriber's normal retrieval format, message translator 3400 translates the message from the caller format to the subscriber's normal retrieval format [step 7500]. Message translator 3400 then stores the message in subscriber mailbox 3300 in the subscriber's normal retrieval format [step 7600], preferably without erasing the message in the caller format. As a result, subscriber mailbox 3300 stores the message in both the caller format and the subscriber's normal retrieval format.

When the subscriber wants to retrieve a pending message, the process shown by the flow chart in FIG. 8 occurs. The subscriber establishes a connection between the subscriber's telecommunications equipment and universal mailbox 2300 to request retrieval of the pending message. The subscriber might accomplish this by dialing universal mailbox 2300's telephone number, or by configuring the subscriber's telecommunications equipment to automatically establish the connection.

Interface 3100 of universal mailbox 2300 receives the subscriber's request for retrieval of the pending message [step 8100], and detects the type of telecommunications equipment the subscriber used to make the request [step 8200]. Because some types of telecommunications equipment permit the subscriber to retrieve the pending message in more than one form, the subscriber must specify the desired retrieval form when using these types of telecommunications equipment. For example, if the subscriber uses ADSI telephone 2130 to retrieve the pending message, the subscriber must specify whether the pending message should be downloaded in voice or ADSI text form.

Interface 3100 then routes the request to service provider 3200. Based on the detected type of subscriber telecommunications equipment and any subscriber specified retrieval format, service provider 3200 determines the subscriber's retrieval format [step 8300]. Service provider 3200 reads the pending message from subscriber mailbox 3300 and determines whether the message is already in the retrieval format [step 8400]. The message would already be in the retrieval format if the retrieval format is the same as the caller format or the subscriber's normal retrieval format. If the message is already in the retrieval format, then service provider 3200 sends the message to the subscriber [step 8500].

If the message is not already in the retrieval format, service provider 3200 notifies message translator 3400. Message translator 3400 reads the message from subscriber mailbox 3300 and translates the message to the retrieval format [step 8600]. After translation, message translator 3400 gives the message to service provider 3200. Service provider 3200, in turn, sends the message to the subscriber in the retrieval format [step 8700].

If the subscriber wants to respond to the retrieved message, the subscriber must first determine what form the response should take. Table 3 shows examples of various responses permitted by some types of telecommunications equipment.

TABLE 3

| RETRIEVAL DEVICE | POTS Phone | ADSI Phone | Pager | Fax | Computer |
|---|---|---|---|---|---|
| RESPONSE TYPES | >Phone call. | >Phone call >Text message. | >Message information. | >Phone call >Fax. | >E-mail >E-Mail with voice file attachment. |

Once the subscriber determines what form the response will take, the process shown by the flow chart in FIG. 9 occurs. The subscriber generates a response for the caller and sends it to universal mailbox 2300. Interface 3100 receives the response from the subscriber in the response format [step 9100], and forwards it to service provider 3200. The response format may differ from both the caller format and the retrieval format.

Upon receipt of the response, service provider 3200 determines whether the caller is also a subscriber to the universal mailbox services by checking for the caller's identity in subscriber mailbox 3300 [step 9200]. If the caller is a subscriber, service provider 3200 stores the response in subscriber mailbox 3300 in the response format [step 9300], and notifies the caller of the pending response, in the manner described above [step 9400].

Off-line, during idle periods, message translator 3400 determines the caller's normal retrieval format from the information stored in subscriber mailbox 3300 [step 9500]. When the response format differs from the caller's normal retrieval format, message translator 3400 translates the response from the response format to the caller's normal retrieval format [step 9600]. Message translator 3400 then stores the response in the caller's normal retrieval format in subscriber mailbox 3300 [step 9700].

If the caller is not also a subscriber, service provider 3200 notifies message translator 3400, which translates the response to the caller format, the same format as the original message sent by the caller [step 9800]. After translating the response, message translator 3400 returns it to service provider 3200. Service provider then determines the location of the caller, including the caller's e-mail address, telephone number, or fax number, from the caller information stored in subscriber mailbox 3300 [step 9900]. Alternatively, service provider 3200 could obtain the caller's location from the subscriber. Service provider 3200 might obtain the caller's location from the subscriber when the caller information would not direct the response to the caller's correct location, for example, when the caller originally sent the message from public telecommunications equipment.

Once service provider 3200 obtains the caller's correct location, service provider 3200 transmits the response to the caller in the caller format [step 10000]. This transmission might take the form of a telephone call, a fax, an e-mail, or a page to the caller.

The universal mailbox consistent with the principles of the present invention permits subscribers to retrieve and respond to messages in any format, independent of the formats used to store, retrieve, and respond to the messages.

The foregoing description of preferred embodiments of the present invention provides illustrations and descriptions, but is not intended to be exhaustive nor limit the invention to the precise form disclosed. Modifications and variations are possible in light of the above teachings or may be acquired from practice of the invention. The scope of the invention is defined by the claims and their equivalents.

For example, Tables 1 through 3 show types of notification, translators, and responses, respectively, corresponding to various types of telecommunications equipment. These were presented as examples only and would obviously include other types of notification, translators, responses, and telecommunications equipment, taking advantage of new advancements in the art, as well as the development of new types of telecommunications equipment.

Furthermore, the subscriber has been described as responding to a retrieved message using the same telecommunications equipment used to retrieve the message. This need not be the case, however. The universal mailbox consistent with the principles of the present invention permits a subscriber to respond to a pending message using a different type of telecommunications equipment than was used to retrieve the message without requiring the subscriber to retrieve the message a second time. The subscriber need only record the reference number associated with the retrieved message to inform the universal mailbox of the identity of the message to which the subscriber subsequently responds.

What is claimed is:

1. A mailbox in a telecommunications system comprising:
    means for receiving information from a caller in a caller format;
    means for determining a normal subscriber format from a normal type of equipment a subscriber has used to retrieve information;
    means for sending the information to the subscriber in a first subscriber format independent of the caller format, the first subscriber format being the normal subscriber format when equipment used by the subscriber to retrieve the information is the normal type of equipment;
    means for receiving a response from the subscriber in a second subscriber format independent of the caller format and the first subscriber format; and
    means for sending the response to the caller in the caller format.

2. The mailbox of claim 1, further comprising
    means for translating the information from the caller format to the normal subscriber format; and
    means for storing the information in the caller format and the normal subscriber format.

3. The mailbox of claim 1, wherein the means for sending the response comprises
    means for translating the response from the second subscriber format to the caller format,
    means for determining a location of the caller, and
    means for sending the response to the caller in the caller format at the determined location.

4. The mailbox of claim 1, further comprising
    means for receiving caller location information from the subscriber, the caller location information indicating a location of the caller; and
    wherein the means for sending the response comprises
        means for sending the response to the caller in the caller format at the location indicated by the received caller location information.

5. The mailbox of claim 1, wherein the means for sending the information includes
    means for receiving a retrieval request from the subscriber, and
    means for sending the information to the subscriber in response to the retrieval request.

6. The mailbox of claim 1, further comprising
    means for determining a subscriber notification preference; and
    means for notifying the subscriber of the received information according to the subscriber notification preference.

7. The mailbox of claim 6, wherein the notifying means includes the means for sending the information to the subscriber in the first subscriber format.

8. A method for exchanging information of different formats, comprising the steps of:
    receiving information from a caller in a caller format;
    determining a normal subscriber format from a normal type of equipment a subscriber has used to retrieve information;
    sending the information to the subscriber in a first subscriber format independent of the caller format, the first subscriber format being the normal subscriber format when equipment used by the subscriber to retrieve the information is the normal type of equipment;
    receiving a response from the subscriber in a second subscriber format independent of the caller format and the first subscriber format; and
    sending the response to the caller in the caller format.

9. The method of claim 8, further comprising the steps of
    translating the information from the caller format to the normal subscriber format; and
    storing the information in the caller format and the normal subscriber format.

10. The method of claim 8, wherein the sending the response step comprises the substeps of
    translating the response from the second subscriber format to the caller format,
    determining a location of the caller, and
    sending the response to the caller in the caller format at the determined location.

11. The method of claim 8, further comprising the step of
    receiving caller location information from the subscriber, the caller location information indicating a location of the caller; and
    wherein the sending the response step comprises the substep of
        sending the response to the caller in the caller format at the location indicated by the received caller location information.

12. The method of claim 8, wherein the sending the information step includes the substeps of
    receiving a retrieval request from the subscriber, and
    sending the information to the subscriber in response to the retrieval request.

13. The method of claim 8, further comprising the steps of
    determining a subscriber notification preference; and
    notifying the subscriber of the received information according to the subscriber notification preference.

14. The method of claim 13, wherein the notifying step includes as a substep the step of sending the information to the subscriber in the first subscriber format.

15. An information processing system comprising:

means for receiving information in a caller format from a caller using caller equipment;

means for storing the information in the caller format in a mailbox belonging to a subscriber;

means for determining a first subscriber format from a normal type of equipment used by the subscriber to retrieve information from the subscriber mailbox;

means for converting the stored information from the caller format to the first subscriber format if the caller format is different than the first subscriber format;

means for receiving a request from the subscriber to retrieve the stored information from the subscriber mailbox;

means for detecting a type of equipment used by the subscriber to send the request;

means for converting the stored information to a second subscriber format when the detected type of equipment is different than the caller equipment and the normal type of equipment; and means for sending the stored information to the subscriber in the second subscriber format when the detected type of equipment is different than the caller equipment and the normal type of equipment.

16. The information processing system of claim 15, wherein the sending means includes means for sending the stored information to the subscriber in the first subscriber format when the detected type of equipment is the same as the normal type of equipment.

17. The information processing system of claim 16, wherein the sending means includes means for sending the stored information to the subscriber in the caller format when the detected type of equipment is the same as the caller equipment.

18. The information processing system of claim 15, wherein the sending means includes means for sending the stored information to the subscriber in the caller format when the detected type of equipment is the same as the caller equipment.

19. The information processing system of claim 15, further comprising means for receiving a response to the retrieved information from the subscriber in a third subscriber format independent of the caller format and the first and second subscriber formats; and means for forwarding the response to the caller.

20. The information processing system of claim 19, wherein the forwarding means comprises means for determining whether the caller is also a subscriber;

means for storing the response in the third subscriber format for later retrieval by the caller when the caller is a subscriber; and means for translating the response from the third subscriber format to the caller format and sending the translated response to the caller when the caller is not a subscriber.

21. The information processing system of claim 15, further comprising means for notifying the subscriber of the received information.

22. The information processing system of claim 21, wherein the notifying means includes means for sending the received information to the subscriber in the first subscriber format.

23. A method for relaying information of different formats, comprising the steps of:

receiving information in a caller format from a caller using caller equipment;

storing the information in the caller format in a mailbox belonging to a subscriber;

determining a first subscriber format from a normal type of equipment used by the subscriber to retrieve information from the subscriber mailbox;

converting the stored information from the caller format to the first subscriber format if the caller format is different than the first subscriber format;

receiving a request from the subscriber to retrieve the stored information from the subscriber mailbox;

detecting a type of equipment used by the subscriber to send the request;

converting the stored information to a second subscriber format when the detected type of equipment is different than the caller equipment and the normal type of equipment; and sending the stored information to the subscriber in the second subscriber format when the detected type of equipment is different than the caller equipment and the normal type of equipment.

24. The method of claim 23, wherein the sending step includes the substep of sending the stored information to the subscriber in the first subscriber format when the detected type of equipment is the same as the normal type of equipment.

25. The method of claim 24, wherein the sending step includes the substep of sending the stored information to the subscriber in the caller format when the detected type of equipment is the same as the caller equipment.

26. The method of claim 23, wherein the sending step includes the substep of sending the stored information to the subscriber in the caller format when the detected type of equipment is the same as the caller equipment.

27. The method of claim 23, further comprising the steps of receiving a response to the retrieved information from the subscriber in a third subscriber format independent of the caller format and the first and second subscriber formats; and forwarding the response to the caller.

28. The method of claim 27, wherein the forwarding step includes the steps of determining whether the caller is also a subscriber;

storing the response in the third subscriber format for later retrieval by the caller when the caller is a subscriber; and translating the response from the third subscriber format to the caller format and sending the translated response to the caller when the caller is not a subscriber.

29. The method of claim 23, further comprising the step of notifying the subscriber of the received information.

30. The method of claim 29, wherein the notifying step includes the substep of sending the received information to the subscriber in the first subscriber format.

31. A messaging center comprising:

means for receiving a message from a caller in a first caller format;

means for notifying a subscriber of the received message;

means for storing the message in the first caller format;

means for determining a normal subscriber format based upon a type of equipment the subscriber has used to retrieve messages;

means for receiving a request for the stored message from the subscriber;

means for sending the stored message to the subscriber in a first subscriber format independent of the first caller format, the first subscriber format being the normal subscriber format when the type of equipment used by the subscriber to request the information is the normal type of equipment;

means for receiving a response to the message from the subscriber in a second subscriber format independent of the first caller format and the first subscriber format;

means for storing the response in the second subscriber format; and means for sending the stored response to the caller in a second caller format independent of the first caller format and the first and second subscriber formats.

32. The messaging center of claim 31, further comprising means for translating the information from the first caller format to the normal subscriber format; and means for storing the information in the first caller format and the normal subscriber format.

33. The messaging center of claim 31, wherein the means for sending the stored response includes means for receiving a request for the stored response from the caller, and means for sending the stored response to the caller in response to the caller's request.

34. The messaging center of claim 31, wherein the notifying means includes the means for sending the stored message to the subscriber in the first subscriber format.

35. A method for exchanging messages in different formats, comprising the steps of:

receiving a message from a caller in a first caller format;

storing the message in the first caller format;

notifying a subscriber of the received message;

determining a normal subscriber format based upon a normal type of equipment the subscriber has used to retrieve messages;

receiving a request for the stored message from the subscriber;

sending the stored message to the subscriber in a first subscriber format independent of the first caller format, the first subscriber format being the normal subscriber format when the type of equipment used by the subscriber to request the information is the normal type of equipment;

receiving a response to the message from the subscriber in a second subscriber format independent of the first caller format and the first subscriber format;

storing the response in the second subscriber format; and sending the stored response to the caller in a second caller format independent of the first caller format and the first and second subscriber formats.

36. The method of claim 35, further comprising the steps of translating the information from the first caller format to the normal subscriber format; and storing the information in the first caller format and the normal subscriber format.

37. The method of claim 35, wherein the sending the stored response step includes the substeps of receiving a request for the stored response from the caller, and sending the stored response to the caller in response to the caller's request.

38. The method of claim 35, wherein the notifying step includes as a substep the step of sending the stored message to the subscriber in the first subscriber format.

39. A mailbox in a telecommunications system comprising:

an interface that receives information from a caller in a caller format;

a translator that determines a normal subscriber format from a normal type of equipment a subscriber has used to retrieve information;

a memory that stores the information in the normal subscriber format; and a service unit that sends the information to the subscriber in the normal subscriber format when equipment used by the subscriber to retrieve the information is the normal type of equipment.

40. An information processing system comprising:

an interface that receives information in a caller format from a caller using caller equipment;

a memory that stores the information in a mailbox belonging to a subscriber;

a translator that determines a normal subscriber format from a normal type of equipment used by the subscriber to retrieve information from the subscriber mailbox, that converts the information from the caller format to the normal subscriber format if the caller format is different than the normal subscriber format, and that stores the information in the subscriber mailbox in the normal subscriber format;

a detector that detects a type of equipment used by the subscriber to send a request to retrieve the stored information from the subscriber mailbox; and a service unit that sends the stored information to the subscriber in the normal subscriber format when the detected type of equipment is the normal type of equipment.

* * * * *